United States Patent
Shibano (10) Patent No.: US 7,131,733 B2
(45) Date of Patent: Nov. 7, 2006

(54) METHOD FOR CREATING BRIGHTNESS FILTER AND VIRTUAL SPACE CREATION SYSTEM

(75) Inventor: Nobuyuki Shibano, Amagasaki (JP)

(73) Assignee: Matsushita Electric Works, Ltd., Osaka (JP)

( * ) Notice: Subject to any disclaimer, the term of this patent is extended or adjusted under 35 U.S.C. 154(b) by 18 days.

(21) Appl. No.: 10/528,455

(22) PCT Filed: Mar. 25, 2004

(86) PCT No.: PCT/JP2004/004239

§ 371 (c)(1),
(2), (4) Date: Mar. 18, 2005

(87) PCT Pub. No.: WO2004/086755

PCT Pub. Date: Oct. 7, 2004

(65) Prior Publication Data

US 2006/0152680 A1    Jul. 13, 2006

(30) Foreign Application Priority Data

Mar. 26, 2003    (JP)    ............................. 2003-085579

(51) Int. Cl.
*G03B 21/14*    (2006.01)
(52) U.S. Cl. .......................... 353/94; 353/121; 353/79; 359/451
(58) Field of Classification Search ................... 353/30, 353/94, 79, 121, 69, 7, 8, 10; 348/840, 745, 348/806; 359/458, 449, 478, 464, 465, 477; 352/69, 70

See application file for complete search history.

(56) References Cited

U.S. PATENT DOCUMENTS

| 3,687,530 | A | | 8/1972 | Watanuki |
| 5,112,121 | A | * | 5/1992 | Chang et al. .................. 359/15 |
| 5,136,390 | A | | 8/1992 | Inova et al. |
| 6,456,339 | B1 | * | 9/2002 | Surati et al. ................. 348/745 |
| 6,513,938 | B1 | * | 2/2003 | Kubota et al. ................. 353/94 |
| 6,733,136 | B1 | * | 5/2004 | Lantz et al. .................. 353/79 |

(Continued)

FOREIGN PATENT DOCUMENTS

DE    21 12 426 A1    5/1972

(Continued)

OTHER PUBLICATIONS

International Search Report for PCT/JP2004/004239 mailed on Jul. 21, 2004.

*Primary Examiner*—William C. Dowling
(74) *Attorney, Agent, or Firm*—Rader, Fishman & Grauer PLLC (57) ABSTRACT

A method for creating brightness filters. The brightness filters are used in a projection system in which divided images are projected on a curved screen from a plurality of projectors with adjacent divided images overlapped partially, in order to adjust brightness of the divided images beforehand so that brightness of overlapping areas between the divided images is in harmony with brightness of non-over-lapping areas. The feature of the present invention resides in that the method includes a step of allocating one of the divided images to a reference image and allocating each of the adjacent divided images to a peripheral image, setting a view point that is coincident with the projection point of the reference image, and obtaining a 2-dimensional reference area of the reference image that is rendered on the screen model and is viewed from the view point.

10 Claims, 9 Drawing Sheets

U.S. PATENT DOCUMENTS

| | | |
|---|---|---|
| 2003/0067587 A1* | 4/2003 | Yamasaki et al. ............. 353/30 |
| 2004/0169827 A1* | 9/2004 | Kubo et al. ................... 353/94 |
| 2005/0052623 A1* | 3/2005 | Hsiung ........................ 353/94 |
| 2005/0083492 A1* | 4/2005 | Taubenberger ............... 353/94 |
| 2005/0117126 A1* | 6/2005 | Miyazawa et al. ........... 353/94 |
| 2005/0206857 A1* | 9/2005 | Yamada ....................... 353/94 |
| 2005/0271299 A1* | 12/2005 | Ajito et al. ................. 382/293 |
| 2005/0275813 A1* | 12/2005 | Yamazaki .................... 353/94 |

FOREIGN PATENT DOCUMENTS

| | | |
|---|---|---|
| JP | 06-178327 A1 | 6/1994 |
| JP | 2000-310826 A1 | 11/2000 |
| JP | 2001-306024 A1 | 11/2001 |
| JP | 2002-131835 A1 | 5/2002 |
| JP | 2002-148711 A1 | 5/2002 |

* cited by examiner

OVERLAPPING AREA

FIG. 11B

OVERLAPPING AREA

Method for Creating Brightness Filter and Virtual Space Creation System

TECHNICAL FIELD

The present invention relates to a virtual space creation system which gives immersion to one or more observers by projecting images over a wide field of view and, more particularly, to a method for creating brightness filters which are used for adjusting brightness of images used in the virtual space creation system.

BACKGROUND ART

Japanese Non-examined Patent Publication No. 2002-148711 discloses a virtual space creation system. This virtual space creation system is intended to immerse an observer in a virtual space with the use of a curved screen giving a wide field of view for image projection.

In order to give immersion to several observers at the same time, a large screen is needed. Japanese Non-examined Patent Publication No. 2001-306024 discloses a system for projecting images on a large screen. In this invention, the system divides a single seamless image into a plurality of divided images, and projects the divided images on a large flat screen from a plurality of projectors. Each of the divided images is projected on the flat screen with adjacent ones of the divided images partially overlapped so as not to produce a clearance between the divided images. Since overlapping areas which overlap between the adjacent divided images have high-brightness, the overlapping areas appear to be bright on the screen. To solve this program, a brightness filter is used. The brightness filter lowers the brightness of the overlapping areas of each of the divided images according to an overlapping amount between divided images. Each of the divided images is projected on the flat screen after the brightness of its overlapping area is lowered by the brightness filter. In this way, this system can obtain a seamless combined image in which the brightness of the overlapping areas is in harmony with the brightness of non-overlapping areas.

In above-mentioned invention, because of a flat screen, the images are projected on the flat screen without being distorted. Therefore, it is easy to calculate overlapping areas of divided images and create brightness filters beforehand, if a positional relationship between the projector and the screen, a shape of the image projected from the projector, etc. are known.

However, if the screen is a curved screen, it is very difficult to calculate overlapping areas of each of the divided images and create brightness filters beforehand, because each of the divided images on the screen is distorted.

DISCLOSURE OF THE INVENTION

In view of the above problem, the object of present invention is to provide a method for creating brightness filters which is adapted in use for an image projection system which projects divided images on a curved screen respectively from a plurality of projectors with adjacent ones of said divided images partially overlapped to reproduce a combined image. The brightness filters are designed to adjust brightness of the divided images for harmonizing the brightness of the overlapping areas with the brightness of non-overlapping areas to make the combined image seamless.

The method comprises the steps of:

(a) producing a screen model reflecting a shape of the curved screen;

(b) setting projection points respectively for projecting therefrom the divided images on the screen model. The projection points are different from each other in conformity with the projectors, respectively;

(c) allocating one of the divided images to a reference image and allocating each of the adjacent divided images to a peripheral image;

(d) setting a view point that is coincident with the projection point of reference image;

(e) obtaining a 2-dimensional reference area of the reference image that is rendered on the screen model and is viewed from the view point;

(f) obtaining a 2-dimensional peripheral area of the peripheral image that is rendered on the screen model and is viewed from the view point;

(g) extracting an overlapping area of the 2-dimensional reference area that overlaps with the 2-dimensional peripheral area;

(h) making a brightness correction for either the overlapping area or the non-overlapping area with regard to the 2-dimensional reference area;

(i) providing a brightness filter for the reference image that realizes the brightness correction;

(j) allocating another divided image to the reference image and repeating the steps of (d) to (i) for providing the brightness filter for each of the divided images.

Hereinafter, a principle of the present invention will be described. In a case where an image is projected on a curved screen, a shape of the image on the curved screen will be distorted if the view point of the image does not coincide with the projection point of the image. However, if the view point of the image coincides with the projection point of the image, the shape of the image on the screen will not be distorted, even if the screen is a curved screen. For example, an image projected from a projector is in the form of a rectangle, the image on the screen, viewed from the projection point of the image, is also in the form of a rectangle.

The method of the present invention applies this principle. In a case where the brightness filter for a certain divided image is prepared, the method allocates that divided image to a reference image and allocates each of the adjacent divided images to a peripheral image (step (c)). Then, the method sets a view point at the projection point of the reference image (step (d)), and obtains a 2-dimensional reference area of the reference image that is rendered on the screen model and is viewed from the view point (step (e)). It should be noted that the 2-dimensional reference area has no distortion because the view point coincides with the projection point of the reference image. Then, the method obtains a 2-dimensional peripheral area of the peripheral image that is rendered on the screen model and is viewed from the view point (step (f)), and extracts an overlapping area of the 2-dimensional reference area that overlaps with the 2-dimensional peripheral area (step (g)). Then the method makes a brightness correction for either the overlapping area or the non-overlapping area with regard to the 2-dimensional reference area (step (h)), and provides a brightness filter for the reference image that realizes the brightness correction (step (i)). It should be remembered that, because the 2-dimensional reference area is a shape having no distortion, this method can easily create the brightness filter for the reference image from the result of the step (h). Then, in order to create the brightness filter for another divided image, the method allocates said another divided image to a reference image and repeats the steps of (d) to (i).

Preferably, the above-mentioned method employs a frame buffer for storing the 2-dimensional reference area and the 2-dimensional peripheral area, respectively. The 2-dimensional reference area is divided into discrete elements having corresponding addresses in the frame buffer, and the 2-dimensional peripheral area is divided into discrete elements having corresponding addresses in the frame buffer. The step (g) compares the addresses of the 2-dimensional reference area with the addresses of the 2-dimensional peripheral area to define the overlapping area as having the common addresses.

This invention also provides a virtual space creation system. The system comprises a curved screen offering a wide field of view, an image creation module which divides a single seamless image into a plurality of divided images which are intended to be projected on the curved screen, and a plurality of projectors which project the divided images respectively on the curved screen in a partially overlapping relation with each other. The image creation module has brightness filters for each of the divided images, and the brightness filters are created using the above-mentioned method for creating brightness filters.

Preferably, the curved screen is in the form of a concavity having a horizontal axis and a vertical axis, and the concavity is curved with respect to the horizontal axis as well as the vertical axis. Concretely speaking, it is preferable that the curved screen is a spherical screen, a dome screen, or a combined screen composed of a flat surface and a curved surface.

Preferably, the image creation module further includes a distortion correction scheme which corrects the divided image in order to minimize a distortion appearing in the divided image that is viewed from a particular view point.

Preferably, the projectors are divided into a first group and a second group, the projectors in the first group project the divided images respectively as right-eye images, and the projectors in the second group project the divided images respectively as left-eye images. The system further includes polarizing filters and a pair of polarized glasses. The polarizing filters process the right-eye image and the left-eye image into respective polarized images. The pair of polarized glasses is adapted to be worn by an observer, and combines the polarized images into a three-dimensional image.

Alternatively, the system may further include a shutter and a pair of glasses in order to obtain a three-dimensional image. The shutter interrupts alternately the right-eye images and the left-eye images. The pair of glasses is adapted to be worn by an observer and have a right-eye lens and a left-eye lens. The glasses are provided with a switch that passes the right-eye image only through the right-eye lens and the left-eye image only through the left-eye lens in synchronous with the alternate interruption of the right-eye images and the left-eyes image by the shutter.

Preferably, the virtual space creation system further includes an input device for selecting a direction and a speed, and a scene controller which, in response to the above-mentioned direction and the above-mentioned speed, moves a scene of the divided images represented on the curved screen, in the above-mentioned direction and at the above-mentioned speed.

Preferably, the virtual space creation system further includes an input device that gives an instruction for changing a content of the divided images, and a content changer which, in response to the instruction, changes the content of the divided image.

Furthermore, this invention provides a set of projectors having brightness filters which are prepared using above-mentioned method. That is, the set of projectors is adapted in use for the virtual space creation system which combines a plurality of divided images into a single image to be rendered on a curved screen. The projectors project the divided images on the curved screen, respectively, in a partially overlapping relation with each other, and are equipped with filters for adjusting brightness of the divided images for harmonizing the brightness of overlapping areas with the brightness of non-overlapping areas to make the single image seamless. The filters are created using the above-mentioned method.

Further more, this invention provides a program for preparing the brightness filters. The program comprises:

(a) a screen model creation module for producing screen model reflecting a shape of the curved screen;

(b) a projection point setting module for setting projection points that project therefrom the divided images on the screen model. The projection points are different from each other in conformity with the projectors, respectively;

(c) a view point setting module which allocates one of the divided images to a reference image and allocates each of the adjacent divided images to a peripheral image. The view point setting module sets a view point at the projection point of the reference image;

(d) a reference area capturing module that obtains a 2-dimensional reference area of the reference image that is rendered on the screen model and is viewed from the view point;

(e) a peripheral area capturing module that obtains a 2-dimensional peripheral area of the peripheral image that is rendered on the screen model and is viewed from the view point;

(f) an extracting module that extracts an overlapping area of the 2-dimensional reference area that overlaps with the 2-dimensional peripheral area;

(g) a brightness correction module that gives a brightness correction for either the overlapping area or the non-overlapping area with regard to the 2-dimensional reference area;

(h) a brightness filter creation module that provides a brightness filter for the reference image that realizes the brightness correction;

(i) a repeater module that allocates another divided image sequentially to the reference image and operates the modules for providing the brightness filter for each of the divided images.

In addition, it is generally said that effective field of view, i.e., the view over which a human being can recognize an object in detail, is 140-degree in a horizontal direction and 85-degree in a vertical direction. In this invention, wide field of view is defined as the view over 140-degree in a horizontal direction and over 85-degree in a horizontal direction.

BEST MODE FOR CARRYING OUT THE INVENTION

Hereinafter, the present invention will be described in more detail with reference to the accompanying drawings.

Figure 1:
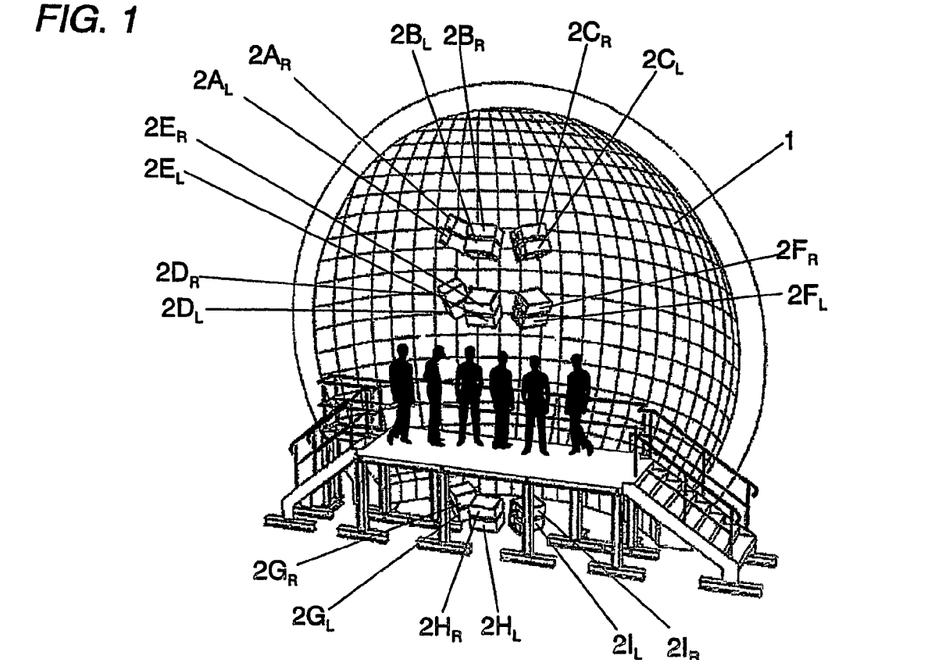
FIG. 1 is a perspective view of a virtual space creation system in accordance with a first embodiment of the present invention.

FIG. 1 shows a virtual space creation system in accordance with a first embodiment of the present invention. This virtual space creation system can immerse one or more observers in a virtual space with the use of a large curved screen giving a wide field of view for image projection. This virtual space creation system can be used for many purposes; for example, a city plan in which many architects and city planners discuss buildings, a bridge, etc. scheduled for construction as looking computer graphics projected on the large curved screen, or an amusement facility in which several observers enjoy images on the screen, such as space, the bottom of the sea, etc., or a fire evacuation drill.

Figure 2:
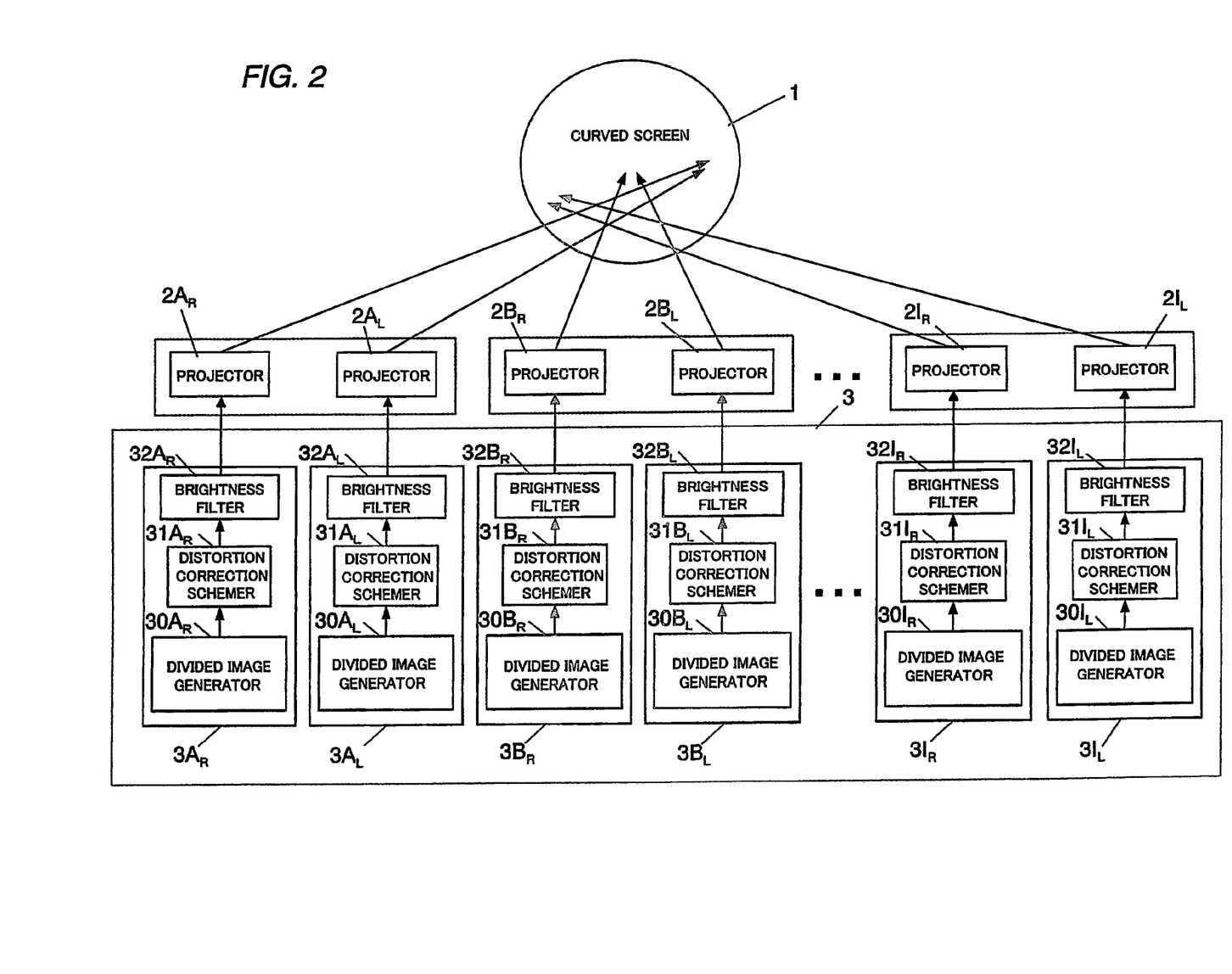
FIG. 2 is a block diagram showing structure of the virtual space creation system.

As shown in FIG. 1 and FIG. 2, the virtual space creation system in accordance with the present invention comprises a large curved screen 1 offering a wide field of view, eighteen projectors $2A_R$ to $2I_R$, $2A_L$ to $2I_L$, and eighteen image creation devices $3A_R$ to $3I_R$, $3A_L$ to $3I_L$. All of the image creation devices make up an image creation module 3.

The projectors and the image creation devices are divided into a right-eye group ($2A_R$ to $2I_R$, $3A_R$ to $3I_R$) and a left-eye group ($2A_L$ to $2I_L$, $3A_L$ to $3I_L$) for creating a three-dimensional image. Although, for the sake of understanding, only right-eye group ($2A_R$ to $2I_R$, $3A_R$ to $3I_R$) will be hereinafter described, left-eye group ($2A_L$ to $2I_L$, $3A_L$ to $3I_L$) can be explained similarly.

Figure 3:
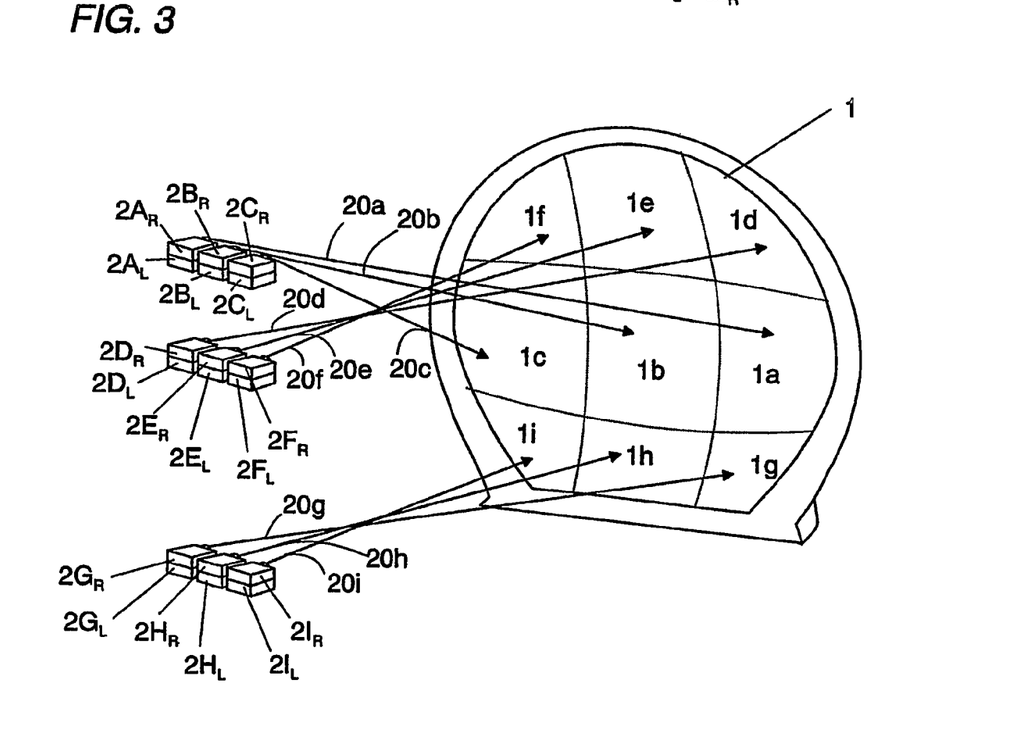
FIG. 3 is a schematic view showing projection path of each projector in the virtual space creation system.

The curved screen 1 is a spherical screen which is in the form of a concavity whose downside is cut in the horizontal direction. The curved screen 1 is 8.5 meters in inside diameter, 180 degrees in horizontal viewing angle, and 150 degrees in vertical viewing angle, and can display an image over a wide field of view. As shown in FIG. 3, the curved screen 1 is divided into 3×3 areas 1a to 1i, on which divided images are projected from nine projectors $2A_R$ to $2I_R$ to reproduce a combined image 20.

The image creation module 3 divides a single seamless image into nine divided images 20a to 20i which are intended to be projected on the curved screen 1, and outputs each of the divide images to the projectors after making some corrections to each of the divided images, as described later.

Each of the image creation devices $3A_R$ to $3I_R$ is connected to each of the projectors $2A_R$ to $2I_R$. Each of the image creation devices $3A_R$ to $3I_R$ comprises a divided image generator $30A_R$, ..., $30I_R$, a distortion correction schemer $31A_R$, ..., $31I_R$, and a brightness filter $32A_R$, ..., $32I_R$.

Each of the divided image generators $30A_R$ to $30I_R$ creates one of the divided images 20a to 20i.

Each of the, distortion correction schemers $31A_R$ to $31I_R$ corrects each of the divided images 20a to 20i using software in order to minimize a distortion appearing in each of the divided images, when viewed from a particular view point.

Figure 4A:
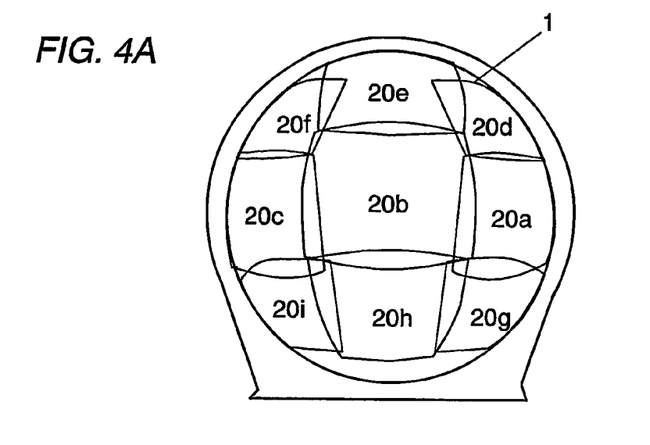
FIG. 4A is a view showing projection areas of each divided image in the virtual space creation system.
Figure 4B:
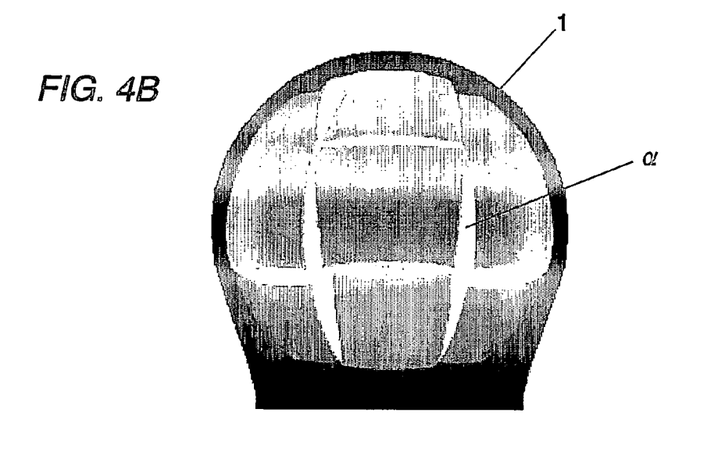
FIG. 4B is a view explaining brightness of overlapping areas in the divided images in the virtual space creation system.

Each of the brightness filters $32A_R$, ..., $32I_R$ is designed to adjust brightness of each of the divided images 20a to 20i in order to reproduce a seamless combined image 20 on the curved screen 1. More particularly, as shown in FIG. 4A, each of the divided images 20a to 20i is projected on the curved screen 1 with adjacent ones of the divided images partially overlapped so as not to produce a clearance between the adjacent divided images on the curved screen 1. As a consequence, as shown in FIG. 4B, because overlapping areas which overlap between the adjacent divided images have high-brightness, the overlapping areas appear to be bright on the screen. To solve this program, used are the brightness filters $32A_R$ to $32I_R$ which determine the overlapping areas of each of the divided images beforehand and lower the brightness of the overlapping areas according to an overlapping amount.

Each of the brightness filters $32A_R$ to $32I_R$ is prepared for each of the image creation devices $3A_R$ to $3I_R$, and sets a change ratio of the brightness for every pixel of each of the divided images. The change ratio is set, for example, in the 0 to 1 range; the value of "1" means that the brightness of the pixel is not changed, and the value of "0" means that the brightness of the pixel is changed to zero, and as the value approaches "0" from "1", the brightness of the pixel is lowered.

Figure 5:
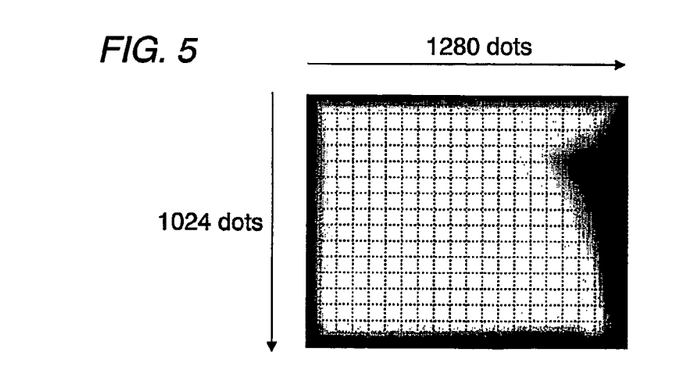
FIG. 5 is a view of one visualized brightness filter.

FIG. 5 shows an example of one visualized brightness filter. In the FIG. 5, the pixel whose change ratio is "1" is painted in white color, and as the change ratio approaches "0", the pixel is painted in deeper black. The divided image of this example is in the form of a rectangle whose resolution is 1280×1024 pixels, and the change ratio of the brightness is set for every pixel. In the FIG. 5, the brightness of the pixel in the peripheral area of the divided image is lowered according to a degree of the overlapping, and the brightness of the pixel in the center area is not changed because the center area does not overlap.

Figure 6A:
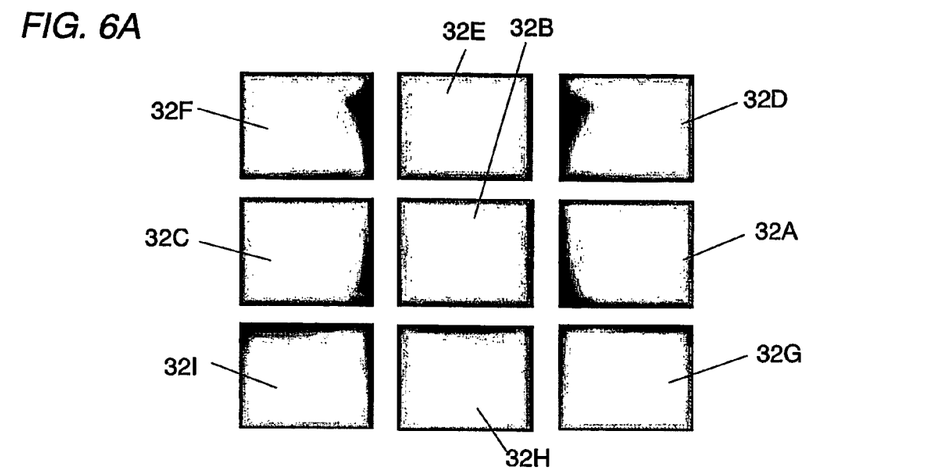
FIG. 6A is a view showing brightness filters for each divided image in the virtual space creation system.
Figure 6B:
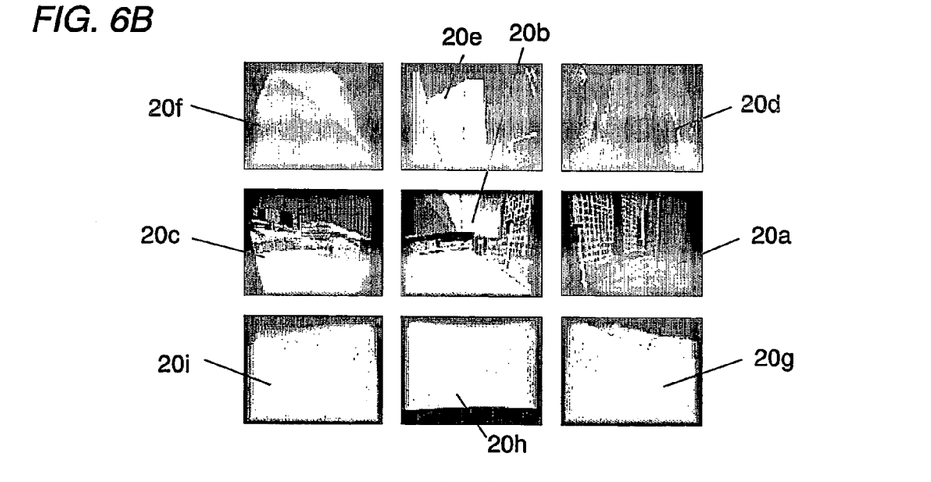
FIG. 6B is a view showing each divided image in which the brightness has been corrected by the brightness filter of FIG. 6A.
Figure 6C:
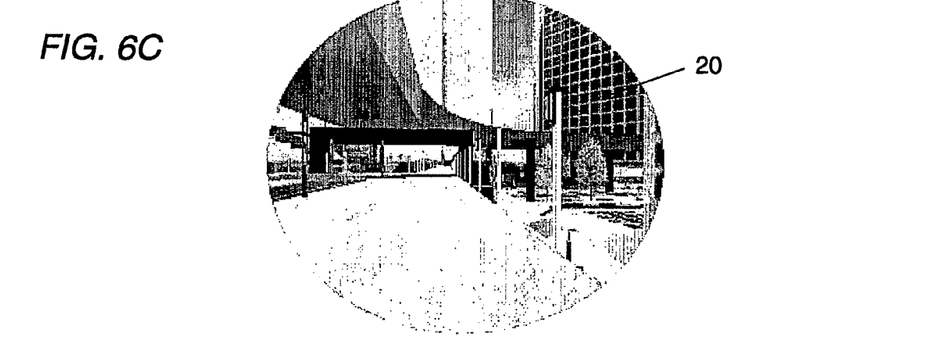
FIG. 6C is a view of a combined image projected on the screen.

In summary, first, the divided images created by the divided image generators $30A_R$ to $30I_R$ are corrected by the distortion correction schemers $31A_R$ to $31I_R$ so as not to be distorted on the curved screen 1, then the brightness of the overlapping areas of the divided images is lowered by the brightness filters $32A_R$ to $32I_R$, then the divided images are projected on the curved screen 1 from the projectors. As a consequence, one seamless combined image 20 can be reproduced on the curved screen 1. FIG. 6A shows an example of each of the brightness filters $32A_R$ to $32I_R$, and FIG. 6B shows an example of each of the divided images 20a to 20i whose brightness has been lowered, respectively, by the brightness filters, and FIG. 6C shows an example of the combined image 20 reproduced on the curved screen 1.

Hereinafter, the method for creating the brightness filters will be described in detail.

Each of the brightness filters $32A_R$ to $32I_R$ is created by a program beforehand, based on information such as a positional relationship between the projectors and the screen, and projector characteristics. Once the brightness filter is created, it is not necessary to create the brightness filter again, unless a position of the projector or a shape of the screen is changed.

Figure 7:
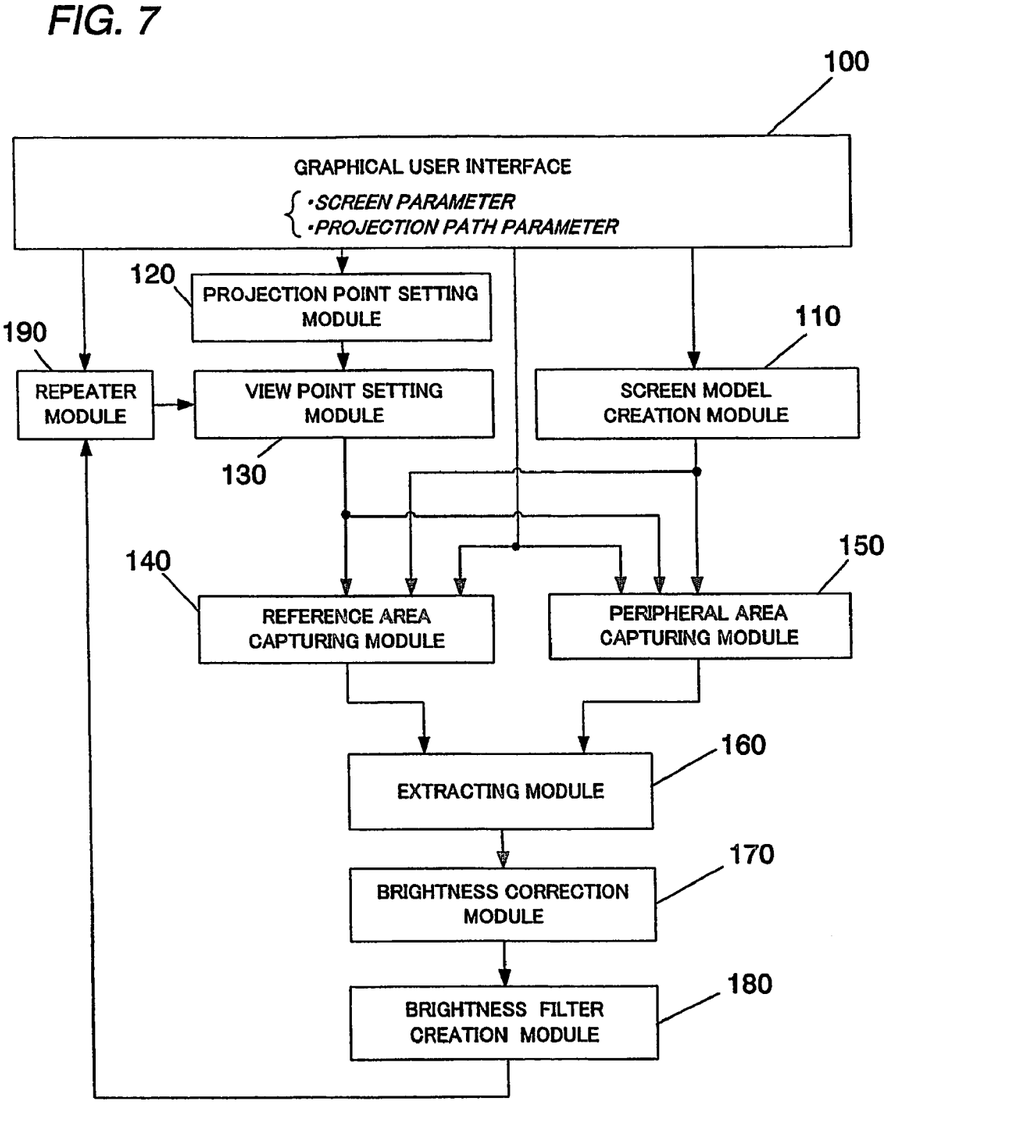
FIG. 7 is a block diagram showing structure of the program for creating the brightness filters.

FIG. 7 shows structure of the program for creating the brightness filters. This program comprises a graphical user interface 100, a screen model creation module 110, a projection point setting module 120, a view point setting module 130, a reference area capturing module 140, a peripheral area capturing module 150, an extracting module 160, a brightness correction module 170, a brightness filter creation module 180, and a repeater module 190.

Figure 8:
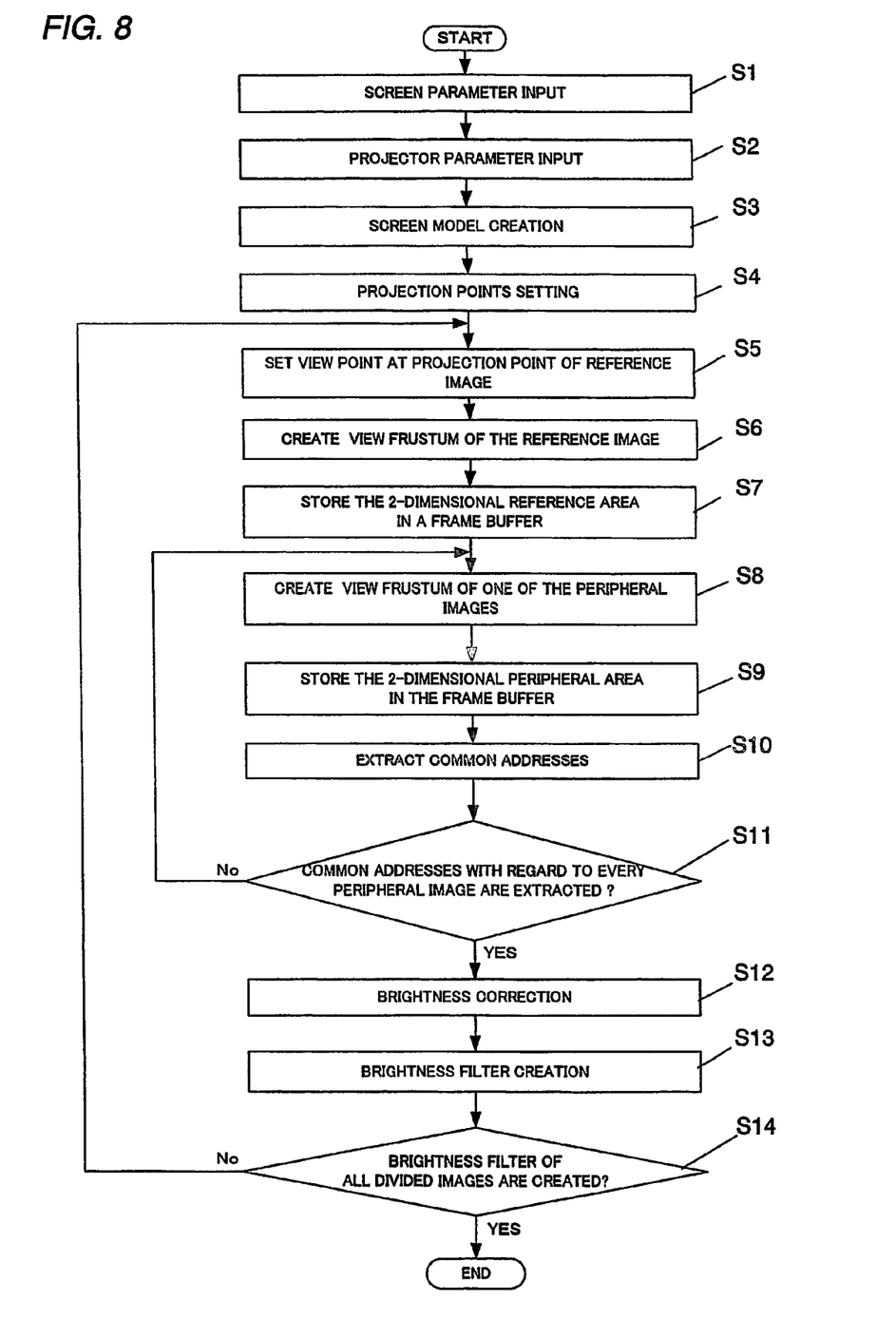
FIG. 8 is a flow chart showing operation of the program.

Hereinafter, this program will be explained with reference to FIG. 8 and FIG. 9. First, a user inputs screen parameters and projector parameters of all projectors through the graphical user interface 100 (step S1, step S2). The screen parameters are, for example, a shape of the curved surface (e.g. a spherical screen), a size of the screen, etc. The projector parameters are, for example, an aspect ratio, an angular field of view of the image projection (e.g. 29 degrees), position coordinate (e.g. (X, Y, Z)=(0.0, −0.9, 10.2) meters), rotational position coordinate (e.g. (Yaw, Pitch, Roll)=(0.0, 13.7, 0.0) degrees), a horizontal and vertical shift of the lens position (e.g. (Horizontal, Vertical) =(0.0, 0.0) ratio), etc.

The screen model creation module 110 produces a screen model 200 reflecting a 3-D shape of the curved screen based on the screen parameters (step S3).

The projection point setting module 120 sets projection points P that project each divided image on the screen model therefrom, based on the projector parameters (step S4). The projection points are different from each other.

The view point setting module 130 allocates one of the divided images to a reference image and allocates each of the adjacent divided images to a peripheral image, and sets a view point V at the projection point P of the reference image (step S5).

Figure 9A:
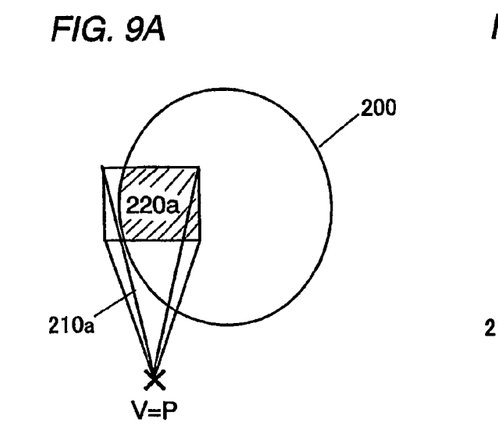
FIG. 9A to FIG. 9D are views for explaining operation of the program, respectively.

The reference area capturing module 140 creates a view frustum 210a which imitates the projection path of the reference image (step S6), as shown in FIG. 9A, and obtains a 2-dimensional reference area 220a of the reference image that is rendered on the screen model 200 and is viewed from the view point V. And the reference area capturing module 140 stores the 2-dimensional reference area 220a in a frame buffer (step S7).

It should be noted that, in FIG. 9A, the 2-dimensional reference area 220a is a shape having no distortion because the view point V coincides with the projection point P of the reference image.

Figure 9B:
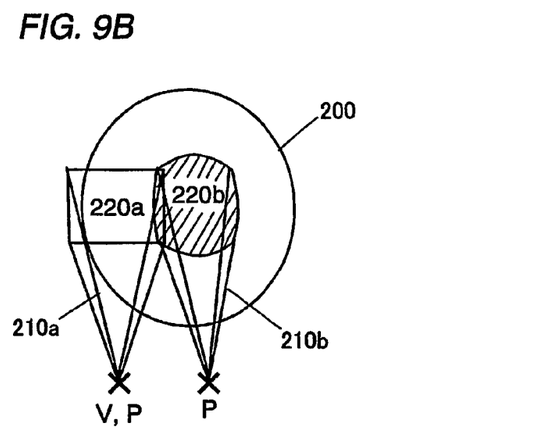

Then, the peripheral area capturing module 150 creates a view frustum 210b which imitates the projection path of one of the peripheral images (step S8), as shown in FIG. 9B, and obtains a 2-dimensional peripheral area 220b of the peripheral image that is rendered on the screen model 200 and is viewed from the view point V. And the peripheral area capturing module 150 stores the 2-dimensional peripheral area 220b in the frame buffer (step S9). In FIG. 9B, the 2-dimensional peripheral area 220b has a shape having distortion on the screen model 200, because the view point V does not coincide with the projection point P of the peripheral image.

Figure 9C:
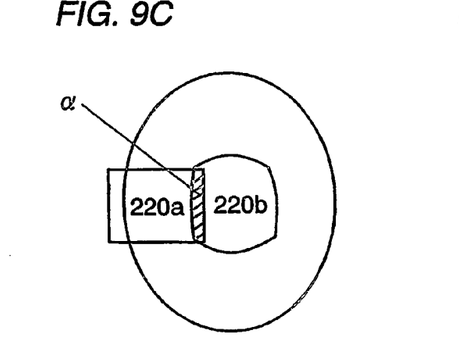

The 2-dimensional reference area 220a and the 2-dimensional peripheral area 220b in the frame buffer are divided into discrete elements having corresponding addresses in the frame buffer, respectively. The extracting module 160 has a function to take an address of each of the discrete elements from the frame buffer. Using this function, the extracting module 160 compares the addresses of the 2-dimensional reference area 220a with the addresses of the 2-dimensional peripheral area 220b to extract the common addresses (step S10). As shown in FIG. 9C, an overlapping area a between the 2-dimensional reference area 220a and the 2-dimensional peripheral area 220b can be identified based on the extracted addresses.

Figure 9D:
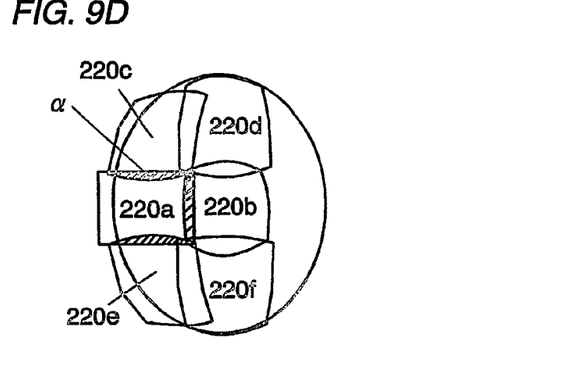

Then, the peripheral area capturing module 150 repeats the-steps of S8 to S10 with regard to every peripheral image around the reference image (step S11), thereby, as shown in FIG. 9D, identifying all of the overlapping area a between the 2-dimensional reference area 220a and the 2-dimensional peripheral areas (220b to 220f in the FIG. 9D).

Figure 10:
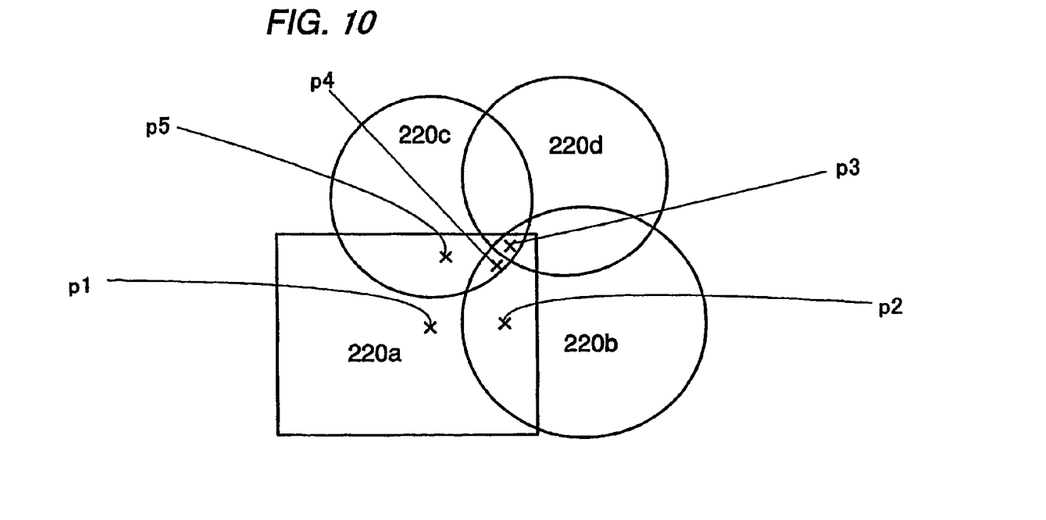
FIG. 10 is a view for explaining a function of the program.

Furthermore, the extracting module 160 can obtain an overlapping amount of the address of each of the discrete elements. Hereinafter, this subject will be described in detail with reference to FIG. 10. When the 2-dimensional reference area 220a is stored in the frame buffer, the extracting module 160 takes the address of each of the discrete elements inside the 2-dimensional reference area 220a from the frame buffer, and stores the addresses as an address inside the 2-dimensional reference area 220a, respectively. For example, in FIG. 10, the address of each of the discrete elements p1 to p5 inside the 2-dimensional reference area 220a is stored as an address inside the 2-dimensional reference area 220a. Then, when the 2-dimensional peripheral area 220b of the 2-dimensional peripheral areas is created and is stored in the frame buffer in the steps S8, S9, the extracting module 160 takes the address of each of the discrete elements inside the 2-dimensional peripheral area 220b (for example, p2, p3, p4 in FIG. 10) from the frame buffer, and stores the addresses as an address inside the 2-dimensional peripheral area 220b, respectively. At this stage, in FIG. 10, the address of each of the discrete elements p2, p3, p4 becomes an overlapping address between the 2-dimensional reference area 220a and the 2-dimensional peripheral area 220b, respectively, because the address of each of the discrete elements p2, p3, p4 has already stored as the address inside the 2-dimensional reference area 220a. Then, when the 2-dimensional peripheral area 220c of the 2-dimensional peripheral areas is created and is stored in the frame buffer in the repeated steps S8, S9, the extracting module 160 takes the address of each of the discrete elements inside the 2-dimensional peripheral area 220c (for example, p3, p4, p5 in FIG. 10) from the frame buffer, and stores the addresses as an address inside the 2-dimensional peripheral area 220c, respectively. At this stage, in FIG. 10, the address of each of the discrete elements p3, p4 becomes an overlapping address between the three 2-dimensional reference areas 220a, 220b, and 220c, respectively, and the address of the discrete element p5 becomes an overlapping address between the 2-dimensional reference area 220a and 220c. Similarly, when the 2-dimensional peripheral area 220d of the 2-dimensional peripheral areas is created and is stored in the frame buffer in the more repeated steps S8, S9, the address of the discrete elements p3 inside the 2-dimensional peripheral area 220d becomes an overlapping address between the four 2-dimensional reference area 220a, 220b, 220c, and 220d. As a consequence, the overlapping amount of the address of each of the discrete elements p1 to p5 becomes as follows;.
 p1: non-overlapping;
 p2: double overlapping;
 p3: fourfold overlapping;
 p4: threefold overlapping;
 p5: double overlapping;

In this way, the extracting module 160 can obtain the overlapping amount of the address of each of the discrete elements.

Figure 11A:
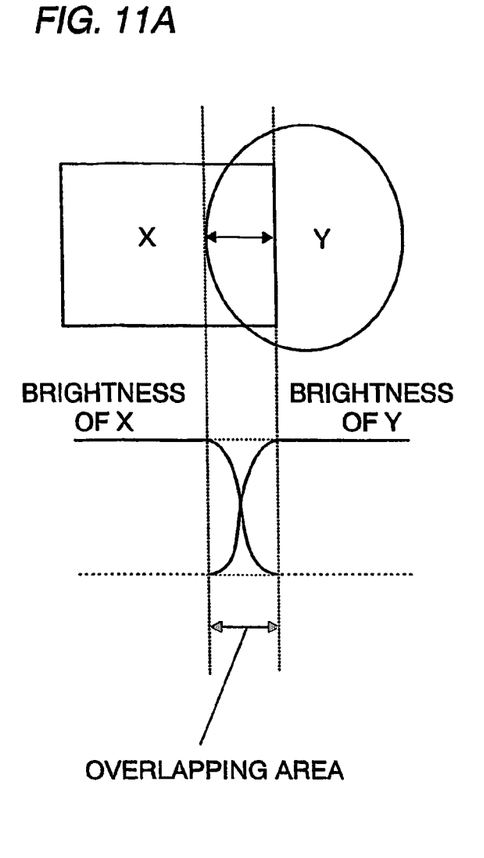
FIG. 11A and FIG. 11B are views for explaining a method for a brightness correction.
Figure 11B:
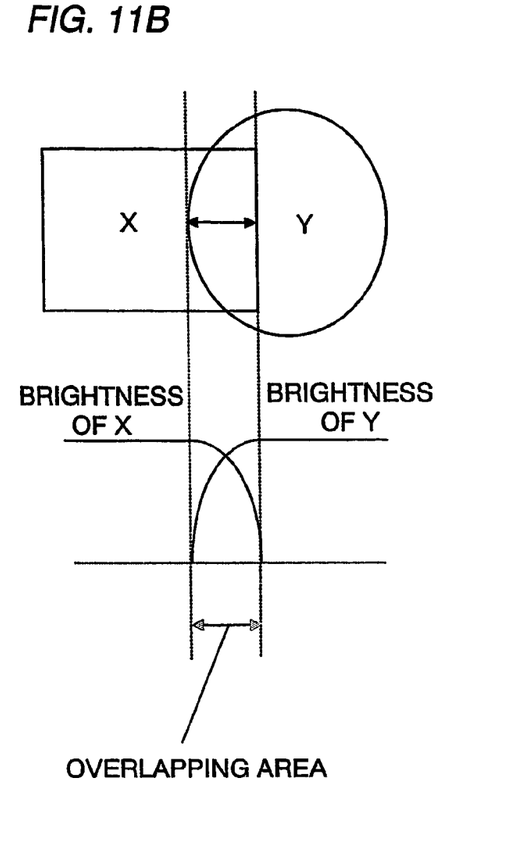

Then, in the step S12, the brightness correction module 170 gives a brightness correction for the overlapping area α in the 2-dimensional reference area 220a. The brightness correction is made according to the overlapping amount of the address. As the overlapping amount increases, the brightness is lowered. Basically, the brightness correction is made so that a total of the brightness in the overlapping area α equals the brightness in the non-overlapping area. For example, because each of the discrete elements p2, p5 in FIG. 10 is the double overlapping, the brightness of an area corresponding to the discrete elements p2, p5 in the overlapping area a is lowered to one-half. Similarly, because the discrete elements p3 is the fourfold overlapping, the brightness of an area corresponding to the discrete elements p3 is lowered to one-quarter, and the brightness of an area corresponding to the discrete elements p4 is lowered to one-third. But, in fact, it is preferred that the brightness of the overlapping area changes gently (in other words, the brightness of the overlapping area does not change rapidly), as shown in FIGS. 11A, 11B.

Then, the brightness filter creation module 180 creates a brightness filter for the reference image based on the result of the brightness correction (step S13). Concretely speaking, in each of the pixels located in the overlapping area in the reference image, the change ratio is set based on the result of the brightness correction, and in each of the pixels located in the non-overlapping area in the reference image, the change ratio is set so that the brightness of the pixel is not changed. By this, a map in which the change ratio of the brightness is set with respect to every pixel is created. The map is the brightness filter.

It should be remembered that, because the 2-dimensional reference area 220a is a shape having no distortion, the brightness filter for the reference image can be created easily, based on the result of the brightness correction. If the shape of the 2-dimensional reference area is distorted, it is very difficult to create the brightness filter for the reference image from the distorted shape. In the present invention, setting the view point V at the projection point P of the reference image prevents the 2-dimensional reference area from being distorted, thereby enabling the brightness filter to be created easily.

Then, the repeater module 190 allocates another divided image sequentially to the reference image, and repeats the steps of S5 to S13. As a consequence, the brightness filters for each of the divided images are created (step S14).

As mentioned above, because the brightness filters in accordance with the present invention are created by the program, the brightness filters are very flexible to a change of, for example, a shape of the screen, a setting position of the projectors, etc. That is, in case of any changes in a shape of the screen or in a setting position of the projectors, all a user has to do is just to input the parameters and run the program.

In addition, as mentioned first, all of the projectors $2A_R$ to $2I_R$, $2A_L$ to $2I_L$ and all of the image creation devices $3A_R$ to $3I_R$, $3A_L$ to $3I_L$ are divided into a right-eye group ($2A_R$ to $2I_R$, $3A_R$ to $3I_R$) and a left-eye group ($2A_L$ to $2I_L$, $3A_L$ to $3I_L$) for creating a three-dimensional image, and in front of each of the projectors (or, inside the projectors), a polarizing filter is provided. The polarizing filter processes a right-eye image projected from the right-eye group or a left-eye image projected from the left-eye group into a polarized image. An observer can see a three-dimensional image by wearing a pair of polarized glasses which combines the polarized image into a three-dimensional image.

Alternatively, in order to create a three-dimensional image, a shutter that interrupts alternately the right-eye image and the left-eye image may be provided. An observer can see a three-dimensional image by wearing a pair of glasses having a switch. The pair of glasses passes the right-eye image only through a right-eye lens and the left-eye image only through a left-eye lens in synchronous with the alternate interruption of the right-eye image and the left-eye image by the shutter.

In addition, the virtual space creation system further includes an input device (not shown) for selecting a direction and a speed and a scene controller (not shown). The input device is, for example, a joystick, or a trackball. The scene controller controls the image creation module 3 to move a scene of the divided images represented on the curved screen 1 in the direction and at the speed inputted through the input device, in response to the direction and the speed. By this, the observer can move the scene on the curved screen 1 by himself (herself), for example, as if he (she) were walking in a virtual space, as well as see the scene.

In addition, the virtual space creation system may include an input device, such as a mouse, for changing a content of the divided images and a content changer which, in response to the instruction, changes the content of the divided image. In this case, an observer can change the content of the divided images, for example, a color or a shape of an object in the divided image, by himself (herself) as well as see the scene.

Figure 12A:
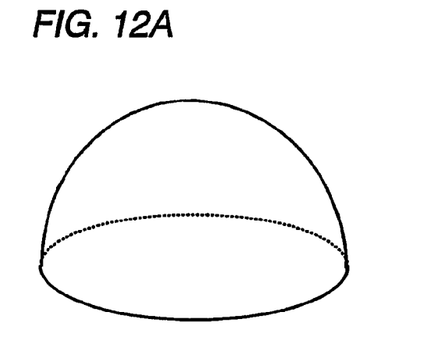
FIG. 12A and FIG. 12B are views showing another shape of the curved screen, respectively.
Figure 12B:
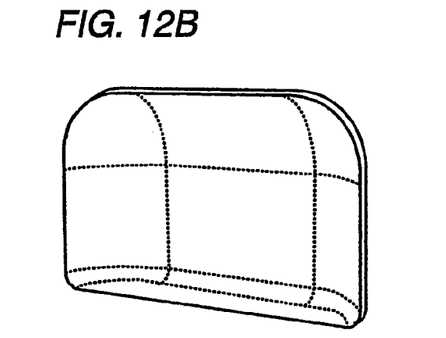

In addition, although the curved screen in accordance with the first embodiment of the present invention is a spherical screen shown in FIG. 1, the curved screen may be a hemispherical screen or a combined screen composed of a flat surface and a curved surface, as shown in FIGS. 12A, 12B. That is, it is preferred that the curved screen in accordance with the present invention is in the form of a concavity having a horizontal axis and a vertical axis, and the concavity is curved with respect to the horizontal axis as well as the vertical axis. As compared to a flat screen, a curved screen can display an image over a wide field of view in a small space.

In addition, the brightness correction module 170 may give a brightness correction for the non-overlapping area so that the brightness of the non-overlapping area is in harmony with the brightness of the overlapping area.

In addition, the divided images created by the divided image generators are not limited to computer graphics, and may be a live-action image.

In addition, in this embodiment, as shown in FIG. 3, the upper projectors $2A_R$ to $2C_R$, $2A_L$ to $2C_L$ project the image to the middle areas 1a to 1c of the screen 1, and the middle projectors $2D_R$ to $2F_R$, $2D_L$ to $2F_L$ project the image to the upper areas 1d to 1f of the screen 1, and furthermore, projectors at both ends project the image crosswise. By this, even if the physical distance between the screen and the projectors is short, a projection distance from the projectors to the screen can be lengthened.

Figure 13:
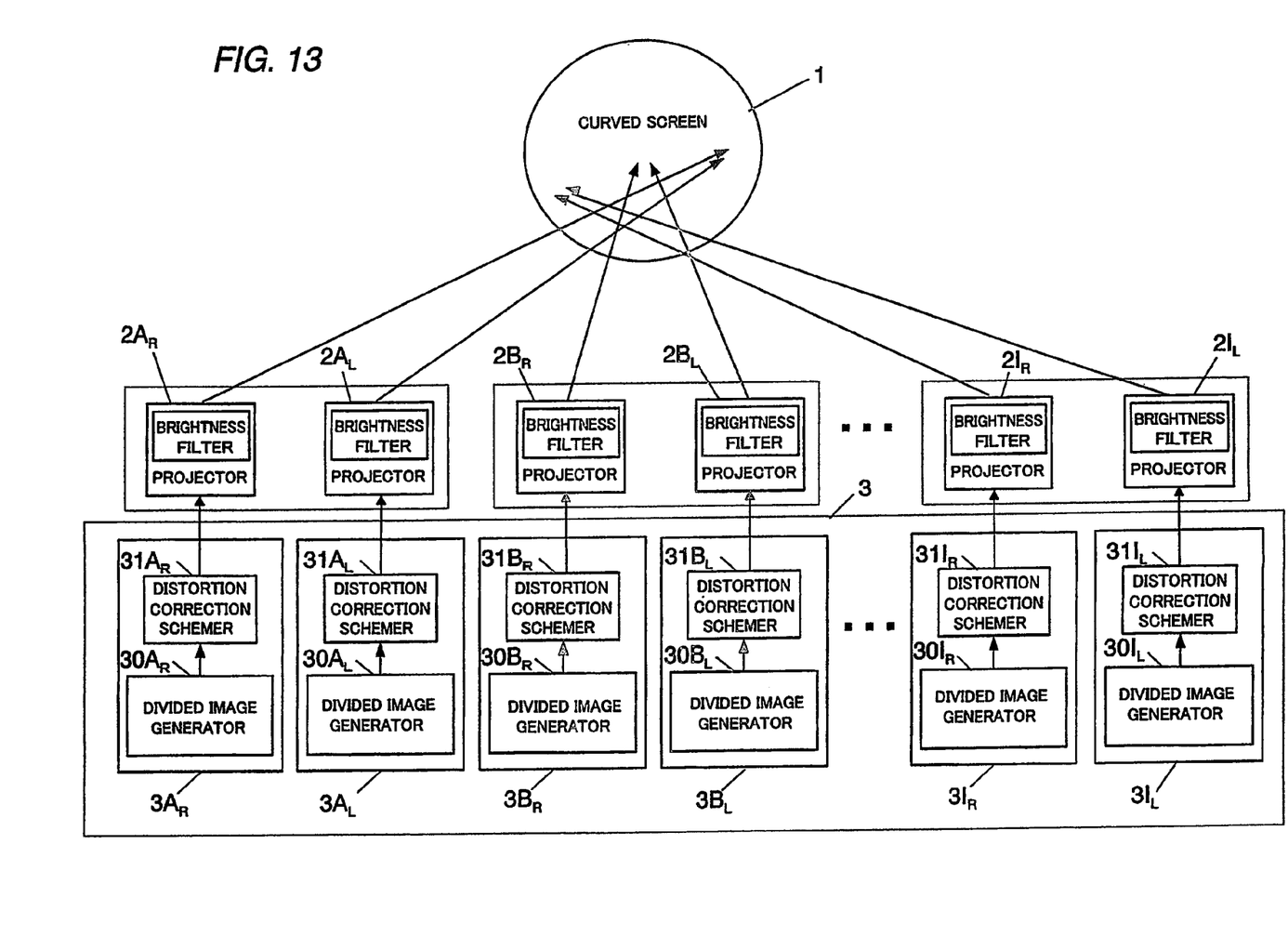
FIG. 13 is a block diagram showing structure of the virtual space creation system in accordance with another embodiment of the present invention.

In addition, although, in this embodiment, the brightness filters are provided in the image creation devices, in another embodiment of the present invention, each of the projectors may have the brightness filter, as shown in FIG. 13.

As mentioned above, as many apparently widely different embodiments of this invention may be made without departing from the spirit and scope thereof, it is to be understood that the invention is not limited to the specific embodiments thereof except as defined in the appended claims.

The invention claimed is:

1. A method for creating brightness filters:
said brightness filters being adapted in use for an image projection system which projects divided images on a curved screen respectively from a plurality of projectors with adjacent ones of said divided images partially overlapped to reproduce a combined image, said filter being designed to adjust brightness of said divided images for harmonizing the brightness of the overlapping areas with the brightness of non-overlapping areas to make said combined image seamless, said method comprising the steps of:
(a) producing a screen model reflecting a shape of said curved screen;
(b) setting projection points respectively for projecting therefrom said divided images on said screen model, said projection points being different from each other in conformity with said projectors, respectively;
(c) allocating one of said divided images to a reference image and allocating each of the adjacent divided images to a peripheral image;
(d) setting a view point that is coincident with the projection point of said reference image;
(e) obtaining a 2-dimensional reference area of said reference image that is rendered on said screen model and is viewed from said view point;
(f) obtaining a 2-dimensional peripheral area of said peripheral image that is rendered on said screen model and is viewed from said view point;
(g) extracting an overlapping area of said 2-dimensional reference area that overlaps with the 2-dimensional peripheral area;
(h) making a brightness correction for either said overlapping area or said non-overlapping area with regard to said 2-dimensional reference area;
(i) providing a brightness filter for said reference image that realizes said brightness correction;
(j) allocating another divided image to said reference image and repeating the steps of (d) to (i) for providing said brightness filter for each of said divided images.

2. The method as set forth in claim 1, wherein said method employs a frame buffer for storing said 2-dimensional reference area and said 2-dimensional peripheral area, respectively, said 2-dimensional reference area being divided into discrete elements having corresponding addresses in said frame buffer, said 2-dimensional peripheral area being divided into discrete elements having corresponding addresses in said frame buffer, said step (g) comparing said addresses of the 2-dimensional reference area with said addresses of the 2-dimensional peripheral area to define said overlapping area as having the common addresses.

3. A virtual space creation system, said system comprising:
a curved screen offering a wide field of view;
an image creation module, said image creation module dividing a single seamless image into a plurality of divided images which are intended to be projected on said curved screen;
a plurality of projectors, said projectors project said divided images respectively on said curved screen in a partially overlapping relation with each other;
wherein said image creation module has a brightness filter for each of said divided images, said brightness filters being prepared by the steps of:
(a) producing a screen model reflecting a shape of said curved screen;
(b) setting projection points respectively for projecting therefrom said divided images on said screen model, said projection points being different from each other in conformity with said projectors, respectively;
(c) allocating one of said divided images to a reference image and allocating each of the adjacent divided images to a peripheral image;
(d) setting a view point that is coincident with the projection point of said reference image;
(e) obtaining a 2-dimensional reference area of said reference image that is rendered on said screen model and is viewed from said view point;
(f) obtaining a 2-dimensional peripheral area of said peripheral image that is rendered on said screen model and is viewed from said view point;
(g) extracting an overlapping area of said 2-dimensional reference area that overlaps with the 2-dimensional peripheral area;
(h) making a brightness correction for either said overlapping area or said non-overlapping area with regard to said 2-dimensional reference area;
(i) providing a brightness filter for said reference image that realizes said brightness correction;
(j) allocating another divided image to said reference image and repeating the steps of (d) to (i) for providing said brightness filter for each of said divided images.

4. The virtual space creation system as set forth in claim 3, wherein said curved screen is in the form of a concavity having a horizontal axis and a vertical axis, said concavity being curved with respect to said horizontal axis as well as said vertical axis.

5. The virtual space creation system as set forth in claim 3, wherein said image creation module further includes a distortion correction scheme which corrects said divided image in order to minimize a distortion appearing in said divided image that is viewed from a particular view point.

6. The system as set forth in claim 3, wherein said projectors are divided into a first group and a second group, the projectors in said first group projecting said divided images respectively as right-eye images, and the projectors in said second group projecting said divided images respectively as left-eye images, said system further including:
polarizing filters processing said right-eye image and said left-eye image into respective polarized images;
a pair of polarized glasses adapted to be worn by an observer, said a pair of polarized glasses combining said polarized images into a three-dimensional image.

7. The system as set forth in claim 3, wherein said projectors are divided into a first group and a second group, the projectors in said first group projecting said divided images respectively as right-eye images, and the projectors in said second group projecting said divided images respectively as left-eye images, said system further including:
a shutter that interrupts alternately the right-eye images and said left-eye images being projected respectively from said projectors of the first group and the second group;
a pair of glasses adapted to be worn by an observer and having a right-eye lens and a left-eye lens, said glasses being provided with a switch that passes the right-eye image only through said right-eye lens and the left-eye image only through said left-eye lens in synchronous with the alternate interruption of said right-eye images and said left-eye images by said shutter.

8. The system as set forth in claim 3, further including;

an input device for selecting a direction and a speed, and a scene controller which, in response to said direction and said speed, moves a scene of said divided images represented on said curved screen in said direction and at said speed.

9. The system as set forth in claim 3, further including;

an input device that gives an instruction for changing a content of said divided images, and a content changer which, in response to said instruction, changes the content of said divided image.

10. A set of projectors adapted in use for a virtual space creation system which combines a plurality of divided images into a single image to be rendered on a curved screen, said projectors projecting said divided images respectively on said curved screen in a partially overlapping relation with each other, and being equipped with filters for adjusting brightness of said divided images for harmonizing the brightness of overlapping areas with the brightness of non-overlapping areas to make said single image seamless, said filters being prepared by the steps of;

(a) producing a screen model reflecting a shape of said curved screen;

(b) setting projection points respectively for projecting therefrom said divided images on said screen model, said projection points being different from each other in conformity with said projectors, respectively;

(c) allocating one of said divided image to a reference image and allocating each of the adjacent divided images to a peripheral image;

(d) setting a view point that is coincident with the projection point of said reference image;

(e) obtaining a 2-dimensional reference area of said reference image that is rendered on said screen model and is viewed from said view point;

(f) obtaining a 2-dimensional peripheral area of said peripheral image that is rendered on said screen model and is viewed from said view point;

(g) extracting an overlapping area of said 2-dimensional reference area that overlaps with the 2-dimensional peripheral area;

(h) making a brightness correction for either said overlapping area or said non-overlapping area with regard to said 2-dimensional reference area;

(i) providing a brightness filter for said reference image that realizes said brightness correction;

(j) allocating another divided image to said reference image and repeating the steps of (d) to (i) for providing said brightness filter for each of said divided images.

* * * * *